United States Patent
Sakamoto et al.

(10) Patent No.: US 11,814,080 B2
(45) Date of Patent: Nov. 14, 2023

(54) AUTONOMOUS DRIVING EVALUATION USING DATA ANALYSIS

(71) Applicant: INTERNATIONAL BUSINESS MACHINES CORPORATION, Armonk, NY (US)

(72) Inventors: Yoshifumi Sakamoto, Shiga-ken (JP); Kentaro Aota, Aichi (JP); John Maxwell Cohn, Richmond, VT (US); Hardy Groeger, Baden-Wuerttemberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 565 days.

(21) Appl. No.: 16/804,968

(22) Filed: Feb. 28, 2020

(65) Prior Publication Data
US 2021/0269061 A1 Sep. 2, 2021

(51) Int. Cl.
*B60W 60/00* (2020.01)
*G08G 1/16* (2006.01)
(Continued)

(52) U.S. Cl.
CPC ....... *B60W 60/0015* (2020.02); *G05D 1/0055* (2013.01); *G06F 11/3013* (2013.01);
(Continued)

(58) Field of Classification Search
CPC ............... B60W 50/04; B60W 50/045; B60W 2050/0028; B60W 2050/0031;
(Continued)

(56) References Cited

U.S. PATENT DOCUMENTS 9,165,477 B2 10/2015 Wilson
10,345,811 B2 7/2019 Phillips et al.
(Continued)

FOREIGN PATENT DOCUMENTS

CN 108304986 A 7/2018
CN 108549366 A 9/2018
(Continued)

OTHER PUBLICATIONS

Mell, P. et al., "The NIST Definition of Cloud Computing" NIST Special Publication (2011) 7 pages.
(Continued)

*Primary Examiner* — James C Kerveros
(74) *Attorney, Agent, or Firm* — Tutunjian & Bitetto, P.C.; Michael A. Petrocelli

(57) ABSTRACT

A computer implemented method for evaluating autonomous vehicle safety that includes defining criteria for safety of autonomous vehicles in a test space, and dividing the test space into an intended test space and a un-intended test space for the criteria for safety of autonomous vehicles. The intended test space includes characterizations for the autonomous vehicle that can be quantified, and the un-intended test space includes characterizations that are not quantifiable. The method further includes measuring the safety of the autonomous vehicles in the intended test space. The applying the un-intended test space is applied to the intended test space as feedback into the intended test space; and evaluating the intended test space including the feedback from the unintended test space using a combined simulation of peripheral vehicles and autonomous vehicles to provide the evaluation of autonomous vehicle safety.

19 Claims, 9 Drawing Sheets

(51) Int. Cl.
  *G08G 1/01* (2006.01)
  *G05D 1/00* (2006.01)
  *G06F 11/30* (2006.01)
  *G06F 11/36* (2006.01)
  *G06F 11/34* (2006.01)

(52) U.S. Cl.
  CPC ...... *G06F 11/3664* (2013.01); *G06F 11/3684* (2013.01); *G08G 1/0133* (2013.01); *G08G 1/0145* (2013.01); *G08G 1/166* (2013.01); *G06F 11/3457* (2013.01)

(58) Field of Classification Search
  CPC ............ B60W 60/0015; G05D 1/0055; G05D 1/0088; G08G 1/166; G08G 1/0145; G08G 1/0133; G06F 11/3668; G06F 11/3457; G06F 11/3664
  USPC ......................................................... 702/108
  See application file for complete search history.

(56) References Cited

U.S. PATENT DOCUMENTS

| | | | |
|---|---|---|---|
| 2012/0310521 | A1 | 12/2012 | Takeuchi |
| 2016/0005313 | A1 | 1/2016 | Cholayil |
| 2016/0253902 | A1 | 9/2016 | Yokoi et al. |
| 2017/0124505 | A1 | 5/2017 | Nakfour et al. |
| 2017/0132117 | A1 | 5/2017 | Stefan et al. |
| 2017/0147722 | A1 | 5/2017 | Greenwood |
| 2017/0166123 | A1 | 6/2017 | Bahgat et al. |
| 2017/0300657 | A1 | 10/2017 | Barrett et al. |
| 2018/0101851 | A1 | 4/2018 | Lowenberg et al. |
| 2018/0149487 | A1 | 5/2018 | Lee et al. |
| 2018/0211120 | A1 | 7/2018 | Smith et al. |
| 2019/0061776 | A1 | 2/2019 | Kindo |
| 2019/0065933 | A1 | 2/2019 | Bogdoll et al. |
| 2019/0108384 | A1 | 4/2019 | Wang et al. |
| 2019/0129436 | A1 | 5/2019 | Sun et al. |
| 2019/0163181 | A1* | 5/2019 | Liu ................... G05D 1/0088 |
| 2019/0179738 | A1 | 6/2019 | Hawthorne et al. |
| 2019/0235521 | A1 | 8/2019 | Mudalige et al. |
| 2019/0236380 | A1 | 8/2019 | Fukuhara et al. |
| 2019/0243371 | A1* | 8/2019 | Nister ............... G05D 1/0242 |
| 2019/0355256 | A1 | 11/2019 | Bielby |
| 2020/0065443 | A1* | 2/2020 | Liu ................... G06F 11/3664 |
| 2020/0082727 | A1 | 3/2020 | Zhao |
| 2020/0180647 | A1 | 6/2020 | Anthony |
| 2020/0193721 | A1 | 6/2020 | Khim et al. |
| 2020/0365013 | A1 | 11/2020 | Simon et al. |
| 2021/0182581 | A1 | 6/2021 | Usui et al. |
| 2021/0237772 | A1* | 8/2021 | Meltz ................... B60W 30/08 |
| 2021/0334420 | A1 | 10/2021 | Du |

FOREIGN PATENT DOCUMENTS

| | | |
|---|---|---|
| CN | 108765235 A | 11/2018 |
| CN | 108961798 A | 12/2018 |
| CN | 109871599 A | 6/2019 |
| CN | 109885870 A | 6/2019 |
| CN | 110352153 A | 10/2019 |
| CN | 110379193 A | 10/2019 |
| CN | 110544380 A | 12/2019 |
| JP | H09211678 A | 8/1997 |
| JP | H11272158 A | 10/1999 |
| JP | 2002163747 A | 6/2002 |
| JP | 2008217113 A | 9/2006 |
| JP | 2008117082 A | 5/2008 |
| JP | 2008299458 A | 12/2008 |
| JP | 2009245042 A | 10/2009 |
| JP | 2015090679 A | 5/2015 |
| JP | 2016534325 A | 11/2016 |
| JP | 2017036135 A | 2/2017 |
| JP | 2017068712 A | 4/2017 |
| JP | 2017173309 A | 9/2017 |
| JP | 2018077835 A | 5/2018 |
| JP | 2019043157 A | 3/2019 |
| JP | 2019512824 A | 5/2019 |
| JP | 2019114005 A | 7/2019 |
| WO | 2004008744 A | 1/2004 |
| WO | 2018101851 A | 6/2018 |
| WO | 2019234726 A | 12/2019 |

OTHER PUBLICATIONS

International Search Report and Written Opinion dated May 7, 2021 in related PCT Application No. PCT/IB2021/050700, pp. 1-9.
US Office Action issued in U.S. Appl. No. 16/804,813 dated May 10, 2022, 70 pages.
List of IBM Patents or Patent Applications Treated as Related dated Aug. 31, 2021, 2 pages.
Kuzumaki, S., "What about Japan's autonomous driving following death accident in the United States?" https://newswitch.jp/p/13269 (Jun. 2018) pp. 1-14.
Nakata, A., "Autonomous driving technology understands the development capabilities of Dantotsu and Weimo by numbers" Silicon Valley Next Report (Feb. 2018) pp. 1-3.
Yoshida, J., "Driving Development Increase the Importance of Simulation?" EE Times (Apr. 2018) pp. 1-5.
Ohnsman, A., "Declaration of automatic driving realized by Toyota president "14.2 billion km test run" " Forbes Japan (Oct. 2016) pp. 1-4.
Yikai, K. et al., "Simulation of Drivers Maneuvering around obstacles and analysis of Traffic congestion using Network-structured models based on fuzzy inferences" (Dec. 2001) pp. 90-97, vol. 42, No. SIG 24, English abstract.
Fujii, H. et al., "Modeling of Traffic Accident in Multi-agent-based Traffic Simulator" (Jan. 2011) pp. 42-49, English abstract.
Zamith, Marcelo, et al. "A new stochastic cellular automata model for traffic flow simulation with drivers' behavior prediction." Journal of computational science 9, Jul. 2015, pp. 51-56.
Gora, Pawel. "Traffic Simulation Framework-a cellular automaton-based tool for simulating and investigating real city traffic." Recent Advances in Intelligent Information Systems 642653, Jan. 2009, pp. 641-653.
Lan, Lawrence W., et al. "Cellular automaton simulations for mixed traffic with erratic motorcycles' behaviours." Physica A: Statistical Mechanics and its Applications, May 2010, pp. 2077-2089, 389,10.
Ming-Zhe, Liu, et al., "A cellular automaton model for heterogeneous and incosistent driver behavior in urban traffic." Communications in Theoretical Physics, Nov. 2012, pp. 744-748, 58,5.
Office Action for related case U.S. Appl. No. 16/804,737 dated Aug. 17, 2021, 39 pages.
USPTO Transmittal Form PTO/SB/21 (07-09), dated Aug. 30, 2021, pp. 1-2.
International Search Report from CN 202180008652.8 dated Sep. 13, 2023 (9 pages).

* cited by examiner

AUTONOMOUS DRIVING EVALUATION USING DATA ANALYSIS

BACKGROUND

The present invention generally relates to autonomous vehicles, and more particularly to evaluation methods for determining the safety of autonomous driving vehicles for the market.

For automobile original equipment manufacturers (OEM) and supplier companies, development of autonomous-driving vehicles is no longer avoidable. Despite acceleration of research and development of autonomous-driving vehicles by introduction of solutions such as artificial intelligence (AI), deep learning, sensor fusion and high-definition maps in the respective companies, many problems still remain in "evaluation techniques" for introducing developed vehicles to the market.

The following problems are generally recognized: (1) evaluation of the safety of an autonomous-driving vehicle highly depends on interaction with peripheral vehicles and others; (2) interdependence between the autonomous-driving vehicle and the peripheral vehicles has quite a number of combinations; and (3) even if an attempt to generate test cases for safety evaluation is made based on the interdependence, a combinatorial explosion can occur.

Therefore, quantitatively evaluating the safety of an autonomous-driving vehicle is considered impossible at least with conventional evaluation techniques because of the impossibility to set a finite test-space.

SUMMARY

In accordance with an embodiment of the present invention, a computer implemented method is provided for evaluating autonomous vehicle safety. In some embodiments, the computer implemented method may include defining criteria for safety of autonomous vehicles in a test space, and dividing the test space into an intended test space and a un-intended test space. The intended test space includes characterizations for the autonomous vehicle that can be quantified, and the un-intended test space includes characterizations that are not quantifiable. In some embodiments, the computer implemented method further includes measuring the safety of the autonomous vehicles in the intended test space, and applying the un-intended test space as feedback into the intended test space. In some embodiments, the method further includes evaluating the intended test space including the feedback from the unintended test space using a combined simulation of peripheral vehicles and autonomous vehicles to provide the evaluation of autonomous vehicle safety.

In some embodiments, the criteria for safety of autonomous vehicles includes a measurement of at least one of traffic complexity and traffic safety. In some examples, measuring traffic complexity and/or traffic safety can include characterizing peripheral vehicles and autonomous vehicles on a traffic passageway. In some embodiments, traffic complexity can be dependent upon the number of pathways on a traffic passageway, a number of moving elements on a traffic passageway, a size of the moving elements on the traffic passageway, distances between the moving elements on the traffic passageway, acceleration/deceleration of moving elements on the traffic passageway, a measurement of number of changes between the different pathways on the passageway, and the complexity of the road shape in a unit of time. The measurements of traffic complexity are quantitative.

In some embodiments, the traffic safety is a measurement that includes at least one of a number of collisions of said autonomous vehicle, number of approaches by the autonomous vehicle to dangerous zones, number of changes in the complexity of traffic and combinations thereof. The measurements of traffic safety are quantitative.

In some embodiments, the unintended test space includes software bugs, vehicle performance by artificial intelligence that is outside practical vehicle performance, and when a number of approaching vehicles approaches an autonomous vehicle over a calculatable threshold. This type of information can not be easily quantified. Once the test space, e.g., unintended test space, is determined for these characteristics, that information is fed back into the analysis as feedback to the portion of the analysis that analyzes quantitative test space, i.e., the intended test space, advantageously providing a finite test space.

In another aspect, a system for evaluating autonomous vehicle safety is provided, in which the system can include a database of criteria for safety of autonomous vehicles in a test space. The system may also include a test space analyzer for dividing the test space into an intended test space and a un-intended test space. The intended test space includes characterizations for the autonomous vehicle that can be quantified, and the un-intended test space includes characterizations that are not quantifiable. In some embodiments, the system may further include a safety calculator for the intended test space using at least one hardware processor to measure the safety of the autonomous vehicles in the intended test space according the database of criteria for safety. The system for evaluating autonomous vehicle safety may further include a feedback generator for feeding the un-intended test space as feedback into the intended test space, and a safety evaluator for evaluating the intended test space including the feedback from the unintended test space using a combined simulation of peripheral vehicles and autonomous vehicles to provide the evaluation of autonomous vehicle safety.

In yet another aspect, the present disclosure provides a computer program product for evaluating autonomous vehicle safety. The computer program product may include a computer readable storage medium (or media) having computer readable program instructions thereon for causing a processor to carry out aspects of the present invention. For example, the computer program product can provide for evaluating autonomous vehicle safety. The computer program product may include a computer readable storage medium having program instructions embodied therewith, the program instructions executable by a processor. The program instructions can cause the processor to define criteria for safety of autonomous vehicles in a test space. The program instructions can cause the processor to divide the test space into an intended test space and a un-intended test space. The intended test space includes characterizations for the autonomous vehicle that can be quantified, and the un-intended test space includes characterizations that are not quantifiable. The program instructions can cause the processor to measure the safety of the autonomous vehicles in the intended test space. The program instructions can cause the processor to apply the un-intended test space as feedback into the intended test space; and evaluate the intended test space including the feedback from the unintended test space using a combined simulation of peripheral vehicles and autonomous vehicles to provide the evaluation of autonomous vehicle safety.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
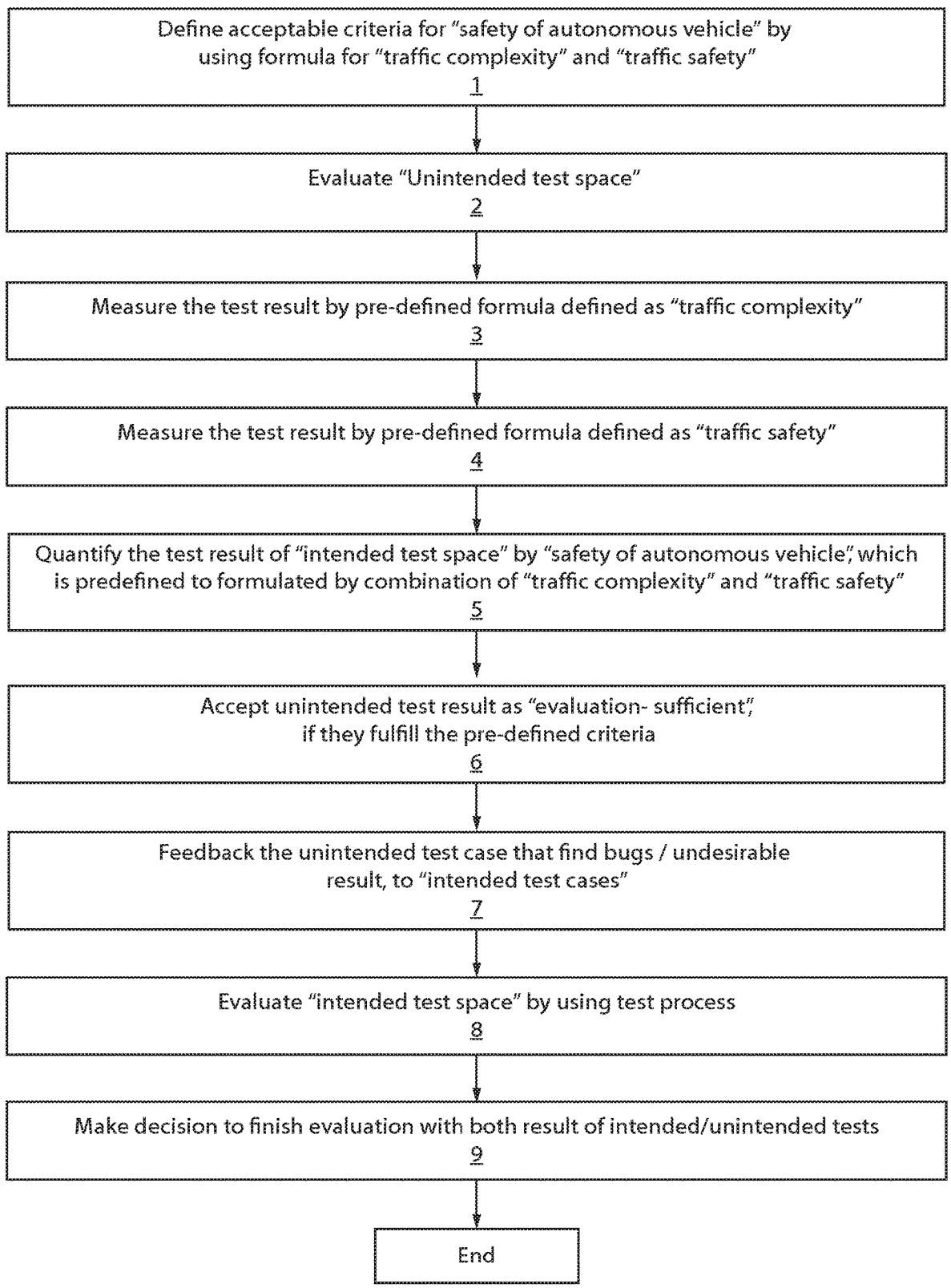
FIG. 1 is a block/flow diagram of a showing a quantitative evaluation method for autonomous-driving vehicle safety, in accordance with an embodiment of the present invention.

In some embodiments, the present difficulties for providing "evaluation techniques" for introducing autonomous vehicles to the market may be overcome by the methods, systems and computer program products that are described herein. The term "autonomous vehicle" denotes a vehicle capable of sensing its environment and operating without human involvement. A human passenger is not required to take control of the vehicle at any time, nor is a human passenger required to be present in the vehicle at all.

For example, an advantage of some embodiments of the present disclosure is to provide an evaluation technique that can resolve the difficulties of prior evaluation methods that fail to define a finite test space. The evaluation techniques that are described herein provide at least two aspects:
 1) The region to divided for evaluation in an "intended test-space" and an "unintended test-space"; and
 2) The "intended test-space" for an autonomous-driving vehicle is defined from the perspective of the "safety of the autonomous-driving vehicle" composed of a combination of the "degree of traffic complexity" and the "degree of traffic safety" and thus is quantified. Likewise, for an application for which the boundary of an evaluation subject cannot clearly be defined, other than an autonomous-driving vehicle, an "intended test-space" may be applied to behaviors that are unfavorable for results.

In the methods, systems and computer program products, the "sufficiency of evaluation of autonomous driving" is defined by: dividing the test-space (according to the division for intended test space and unintended test space) to be filled into a "quantitatively measurable region" and an "unmeasurable region", and clearly defining means for feedback from the unmeasurable region to the measurable region. The methods, systems and computer program products can also provide the criterion for completion of the feedback. In some embodiments, the methods, systems and computer program products provided herein can define specific and realistic measurement means using elements particular to the specific development subject of "autonomous driving", e.g., according to degree of traffic complexity and traffic safety.

The methods, systems and computer program products of the present disclosure provides a technique having advantages, such as dividing a test-space to be filled into a "quantitatively measurable region" and an "unmeasurable region", wherein different completion criteria that enable objective determination are defined for the both. The quantitatively measurable region is the intended test space, and the unmeasurable region is the unintended test space. This is distinguished from test techniques that attempt to make a test-space that is not definite (unintended test-space) close to full coverage to the possible extent by spending time and increasing the total driving distance.

Further, the methods, systems and computer program products of the present disclosure further provide that an entire unintended test space in converted into the intended test-space, in which only regions each meeting a particular criterion are fed back and convergence of the amount of feedback is set as the criterion for completion, while prior test techniques aim to achieve 100% coverage for an unintended test-space that is not finite, based on the premise that it is impossible to measure the unmeasurable.

After proving that the test-space is finite by putting the test space into a function using a combination of elements particular to the test subject, e.g., autonomous-driving vehicle, the intended test-space for evaluation of the safety of the autonomous-driving vehicle is clearly defined in a measurable manner. The subject is focused on the region that needs evaluation, the elements and the possible value ranges from the perspective of "evaluation of safety", rather than all of the functions of the autonomous-driving vehicle and the entire peripheral traffic flow range, which makes the approach effective.

The methods, systems and computer program products of the present disclosure are now discussed in greater detail with reference to FIGS. 1-10.

Figure 2:
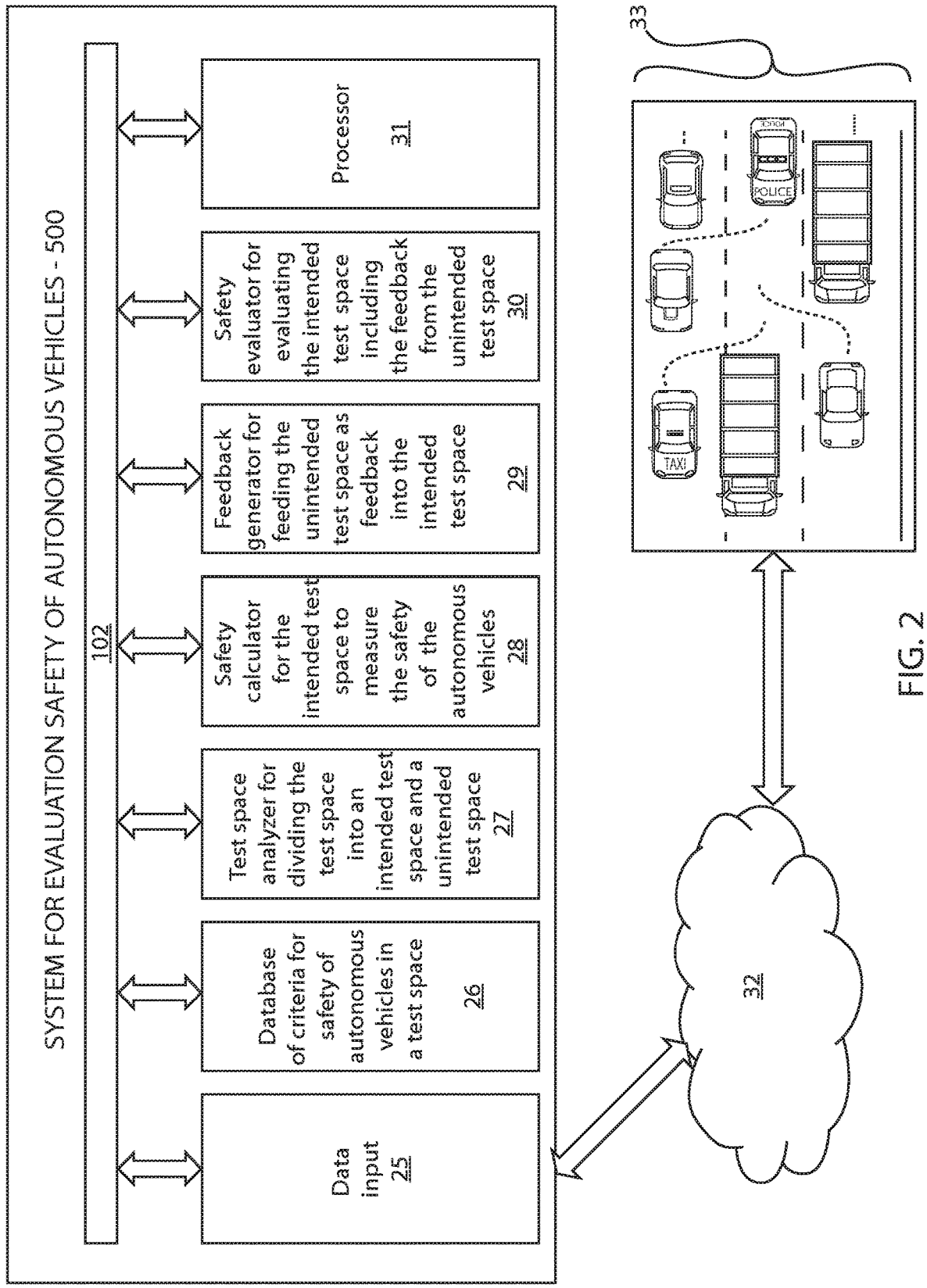
FIG. 2 is a block diagram of a system for providing a quantitative evaluation method for autonomous-driving vehicle safety.

FIG. 1 is a block/flow diagram of a showing a quantitative evaluation method for autonomous-driving vehicle safety. FIG. 2 is a block diagram of a system 500 for providing a quantitative evaluation method for autonomous-driving vehicle safety.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, in some embodiments, the quantitative evaluation method for autonomous-driving vehicle safety may include defining criteria for "safety of autonomous vehicle" by using a formula for "traffic complexity" and "traffic safety" at block 1. Referring to FIG. 2, the system 500 for evaluating autonomous driving vehicle safety may include a data input 25, e.g., transceiver, for receiving data from a subject autonomous-driving vehicle in a driving environment 33. The subject autonomous-driving vehicle in a driving environment 33 may be simulated, may be in recording traffic interactions in real time, or may be providing data following a real world navigation test. The subject autonomous-driving vehicle in the driving environment 33 may communicate to the data input 25 of the system 500 for evaluating autonomous driving vehicle safety over the internet 32. The driving criteria may be stored in memory in the system 500, e.g., in a database of criteria for safety of autonomous vehicles 26.

In some embodiments, defining traffic complexity is defined in degrees ranging from levels of low complexity to levels of high complexity. In some examples, the degree of complexity for the traffic may be expressed as a function of, e.g., the number of pathways on a traffic passageway (e.g., number of lanes 11 on a road 10), number of moving elements on a traffic passageway, the size of the moving elements on the traffic passageway, distances between the moving elements on the traffic passageway, the acceleration/deceleration of moving elements on the traffic passageway, the number of changes between the different pathways on the passageway, and the complexity of the road shape in a unit of time. In one example, the moving elements are vehicles 12, the traffic passageway is a road 10, and the number of pathways are lanes 11.

Figure 4:
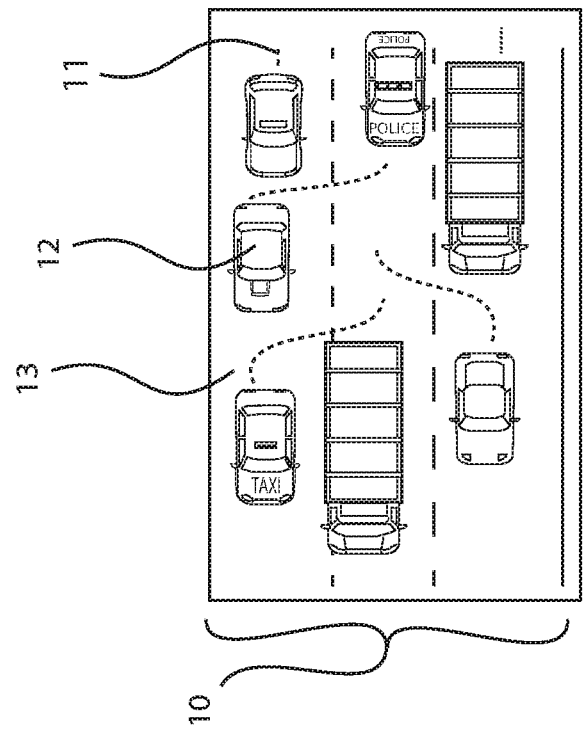
FIG. 4 is an illustration indicating one example of high complexity traffic.
Figure 3:
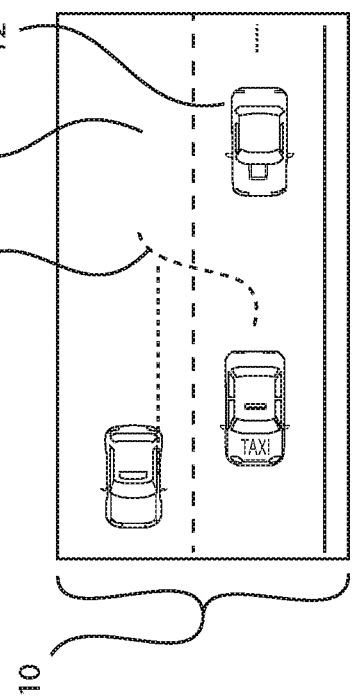
FIG. 3 is an illustration indicating one example of low complexity traffic.

FIG. 3 is an illustration indicating one example of low complexity traffic. In this example, there are only two lanes 11 of traffic with three cars 12 on the road 10, and only one car 12 for this unit of time is making a lane change. The lane change is identified by reference number 13. FIG. 4 is an illustration indicating one example of high complexity traffic. By comparison to the low complexity traffic example depicted in FIG. 3, the high complexity examples includes a greater number of lanes 11, e.g., three, a greater number of vehicles 12, e.g., seven, and a greater number of lane changes 13. In this example, the degree of traffic complexity can be limited because the values of the elements for the function can be limited. Therefore, the degree of complexity can be expressed quantitatively. For example, the topology of roads, the number of lanes in a road, and the number of vehicles on a road, are all measurements that may be made quantitatively.

Figure 5:
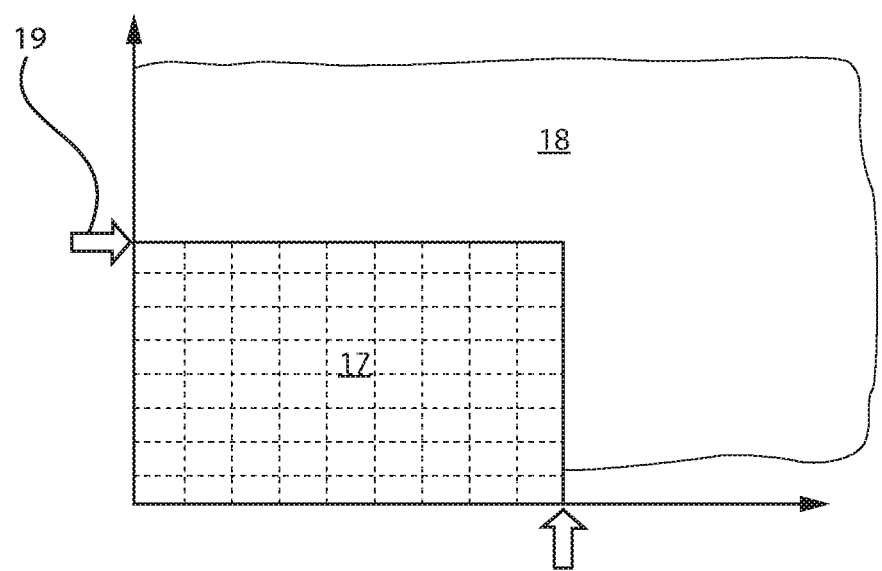
FIG. 5 is a plot illustrating unintended test spaces and intended test spaces, in accordance with one embodiment of the present disclosure.

Referring to FIG. 1, the method may include evaluating an "unintended test space" by using process/tools which can evaluate products randomly and sparsely, and without bias at block 2. In some embodiments, the region to be evaluated is divided into an "intended test-space" and an "unintended test-space", as depicted in FIG. 5. An "intended test-space" is a test-space that can achieve full coverage by means of a combination of design requirements. The design requirements may be what are intended and can be quantified as with the conventional evaluation techniques, and is determined as "sufficient" when a required degree of coverage is quantitatively measured. On the other hand, it is assumed that the unintended test-space cannot achieve full coverage, because it is a region that is difficult or impossible to define as a design requirement in advance and needs evaluation and is a space "whose boundary cannot be found". FIG. 5 illustrates a clear boundary 19 between the intended test space 17 and the unintended test pacer 18. This can provide that a completion rate can numerically be measured, and full coverage can be provided.

Referring to FIG. 2, the evaluating of the "unintended test space" at block 2 of FIG. 1 may be provided by the test space analyzer 27 for dividing the test space into an intended test space and a un-intended test space of the system 500 for evaluating autonomous driving vehicle safety.

The completion rate is the remaining unintended test space. The unintended test space is reduced by feedback to the intended test space. In some embodiments, analysis of the unintended test space is fed as feedback into the intended test space. In some embodiments, once the unintended test space appears as a software bug or undesirable vehicle behavior, like a vehicle crash, and/or too many surrounding vehicles around the autonomous vehicle. These scenarios once become known are then treated as being within the intended test space, because of the feedback described in FIG. 6. For example, analysis of the unintended test space is fed as feedback into the intended test space, so that the intended test space is fully covered. It can be said that when the entirety of the unintended test space if fed as feedback into the intended test space, the unintended test space becomes empty. This may also be characterized as an evaluation being sufficient for the entirety of the test space.

An unintended test can be conducted using means for performing evaluation randomly with a certain degree of dispersion in a scattered manner with no bias to a particular space. One embodiment of for providing this evaluation employs three layers of simulated vehicle behavior. The layers may include a section that generates a driving route, a section that generates a specific behavior of a vehicle, and a section that generates a particular behavior comes from driver's personality. Pseudo random values are used to provide any variation in the evaluation and are used to weight the value of each of the layers in the simulation. For example, pseudo random values can be used where each of the vehicles are located, what the initial velocity for the vehicles are, and what kind of route the vehicles should travel on. In some embodiments, these parameters or selections are set "randomly" so that the system can generate various patterns of vehicle's behavior. Pseudo random values are employed, as opposed to pure random values, because the generated behaviors of the methods, systems and computer program products are reproducible. Specific examples of the means for performing the evaluation are provided in U.S. patent application Ser. No. 16/804,737, titled "Automatic Scenario Generator Using a Computer for Autonomous Driving". The entirety of U.S. patent application Ser. No. 16/804,737, titled "Automatic Scenario Generator Using a Computer for Autonomous Driving" is incorporated herein, by reference. As a result of evaluation, if a new test-space that should be included in the intended test-space (that is, a test-space that should quantitatively be measured and covered) is found, such test-space is dynamically fed back. Whether or not an event occurred that should be treated as a bug that should not be generated as a result of evaluation is employed for the criterion for the feedback. In some embodiments, as a result of the evaluation, if a new test-space that should be included in the intended test space (that is, a test space that should quantitatively be measured and covered) is found, such test-space is dynamically fed back. In some embodiments, it is determined that "evaluation is sufficient" when the feedback from the unintended to the intended converges to be equal or below a certain value determined in advance.

Referring to FIG. 1, the method may continue with measuring the test result using the traffic complexity formula at block 3. Equation (1) illustrates one example of an equation for calculating the degree of traffic complexity. Equation (1) is as follows:

$$\text{Degree of traffic complexity}(T\text{-complex}) = \Sigma_{t \in unitT} f \text{lane count}(t) + \Sigma_{t \in unitT} f \text{vehicle count}(t) \Sigma_{t \in unitT} f \text{vehicle sizes}(t) + \Sigma_{t \in unitT} \text{vehicle speed differential}(t) + \Sigma_{t \in unitT} \text{distance between vehicles}(t) + \Sigma_{t \in unitT} \text{acceleration/deceleration}(t) + \Sigma_{t \in unitT} \text{lane change count}(t) + \Sigma_{t \in unitT} \text{topology}(t) \qquad (1)$$

In equation 1, (t) is a unit of time, and "topology" refers to the shape of the traffic passageway. As illustrated in equation (1), traffic complexity is a measurement of the vehicle count (fvehicle count(t)) on a roadway, the sizes of the vehicles (fvehicle sizes(t)), the difference of speed between vehicles (vehicle speed differential(t)), the distance between vehicles as they are in traffic (distance between vehicles(t)), the changes in acceleration and deceleration of the vehicles as the travel in traffic (acceleration/deceleration(t)), the number of changes between lanes for the vehicles (lane change count(t)) and the topology (topology(t)) of the road that the vehicles are traveling on. These are factors that can be used to provide the intended test space for the autonomous driving safety evaluation.

Referring to FIG. 2, measuring the test result using the traffic complexity formula at block 3 of the method depicted in FIG. 1 may be provided by the safety calculator 27 of the system 500 for evaluating autonomous driving vehicle safety. The calculations may employ the processor 31, e.g., hardware processor, of the system 500 for evaluating autonomous driving vehicle safety.

Turing to block 4 of FIG. 1, the method may further include measuring the test result using the formula for the degree of traffic safety. The "traffic safety" of block 4 is an expression of a degree of traffic safety, which can be expressed as the number of collisions, the number of approaches to danger zones, changes in degree of traffic complexity in a unit of time (t). In some embodiments, the number of collisions and the number of approaches to dangerous zones are parameters for the vehicle that is subject for evaluation. In this instance, the degree of traffic safety is limited, because the values the elements of the function can have are limited. Therefore, the degree of traffic safety can be expressed quantitatively, in equation (2) as follows:

$$\text{Degree of traffic safety}(T\text{-safety}) = \Sigma_{t \in unitT} f \text{collisions}(t) + \Sigma_{t \in unitT} f \text{approaches to dangerous zones}(t) + \Sigma_{t \in unitT} f \text{traffic complexity degree change}(t) \qquad (2)$$

The "degree of traffic safety" is defined as a function composed of a combination of events occurred as results in a unit time, e.g., the number of collisions (fcollisions(t)), the number of approaches to dangerous zones (f approaches to dangerous zones(t)), and the number of times there is a change in the traffic complexity as the vehicle is traveling on a roadway (f traffic complexity degree change(t)), etc. This events considered in determining the degree of traffic safety is finite, because the number of events and the values the respective events may have are finite, and thus can quantitatively be measured.

Figure 6:
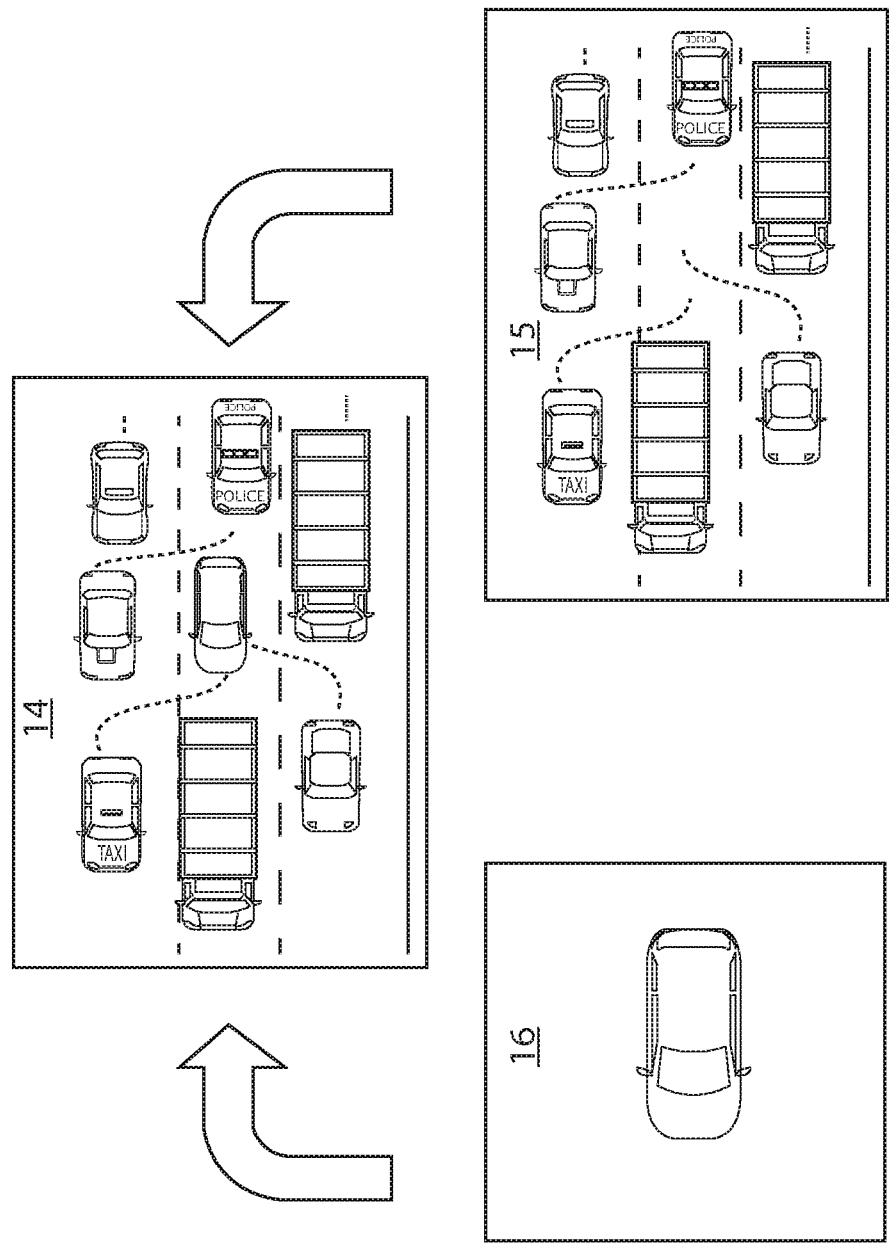
FIG. 6 is an illustration of a combined simulation of an autonomous vehicle simulation environment and a peripheral vehicle simulation environment for use in quantitatively evaluating the safety of autonomous vehicles.

Referring to FIG. 2, measuring the test result using the safety complexity formula at block 4 of the method depicted in FIG. 1 may be provided by the safety calculator 27 of the system 500 for evaluating autonomous driving vehicle safety. The calculations may employ the processor 31, e.g., hardware processor, of the system 500 for evaluating autonomous driving vehicle safety The method may further include that the safety of the autonomous-driving vehicle can be measured by determining whether or not meeting a criterion for a certain "degree of traffic safety" is achieved in an evaluation under an environment meeting a criterion for a certain "degree of traffic complexity". This may include quantifying the test result of "intended test space" by "safety of autonomous vehicles", which is pre-defined to be formulated by combination of "traffic complexity" and "traffic safety" at block 5 of FIG. 1. In some embodiments, following defining the criteria for the safety of autonomous vehicles at block 1, a combined simulation 14 is provided by combining a peripheral simulation environment 14 and an autonomous vehicle simulation environment 16, as depicted in FIG. 6. For examination of autonomous vehicle simulation, the peripheral vehicle simulation environment is used, in which a certain degree of traffic complexity can be maintained. Each of the parameters for the degree of traffic complexity is generated pseudo-randomly within a designated range. In some embodiments, the method makes a simulation target autonomous vehicle move in a dedicated simulation environment. In some embodiments, the methods perform a simulation in a combined simulation environment (co-simulation) in which interaction between the peripheral vehicles and the autonomous vehicle is enabled. In some embodiments, the methods, systems and computer program products of the present disclosure evaluate the safety of the autonomous vehicle by quantitatively measuring, e.g., an integrated value, a highest value, and an average value of the degrees of traffic safety per a certain time (t).

The "environment meeting a criterion for a certain degree of traffic complexity" can be defined by analyzing and quantifying probe data acquired from models based on images of actual traffic flows from fixed cameras or sensor-mounted vehicles.

At block 6 of the method depicted in FIG. 1, the method can continue with accepting the unintended test results as "evaluation-sufficient" if they fulfill the pre-defined criteria. The predefined criteria may have been set at block 1 of the method depicted in FIG. 1.

The resulting value can be corrected to a more appropriate and effective value through the aforementioned "feedback from the unintended test-space to the intended test-space" at block 7.

Intended test space and unintended test space classify the kind of test result by its behavior. For example, in the case of an autonomous driving vehicle evaluation, predictable behavior, such as movement of vehicle, e.g., deceleration under conditions of TTC (time to collision) less than a pre-defined value is an intended behavior that can be evaluated with pre-defined test cases by combination of design requirements. This is what is being considered in intended test space. Unpredictable behavior, such as sudden acceleration caused by AI (artificial intelligence)'s (which is not consistent with a vehicles general performance), or complex interactions with a plurality of surrounding vehicles including crashes among them, is classified in unintended test space. Test cases generally can not be computed for such situations intentionally, so they are referred to as "unintended test space" or unintended test results.

Figure 7:
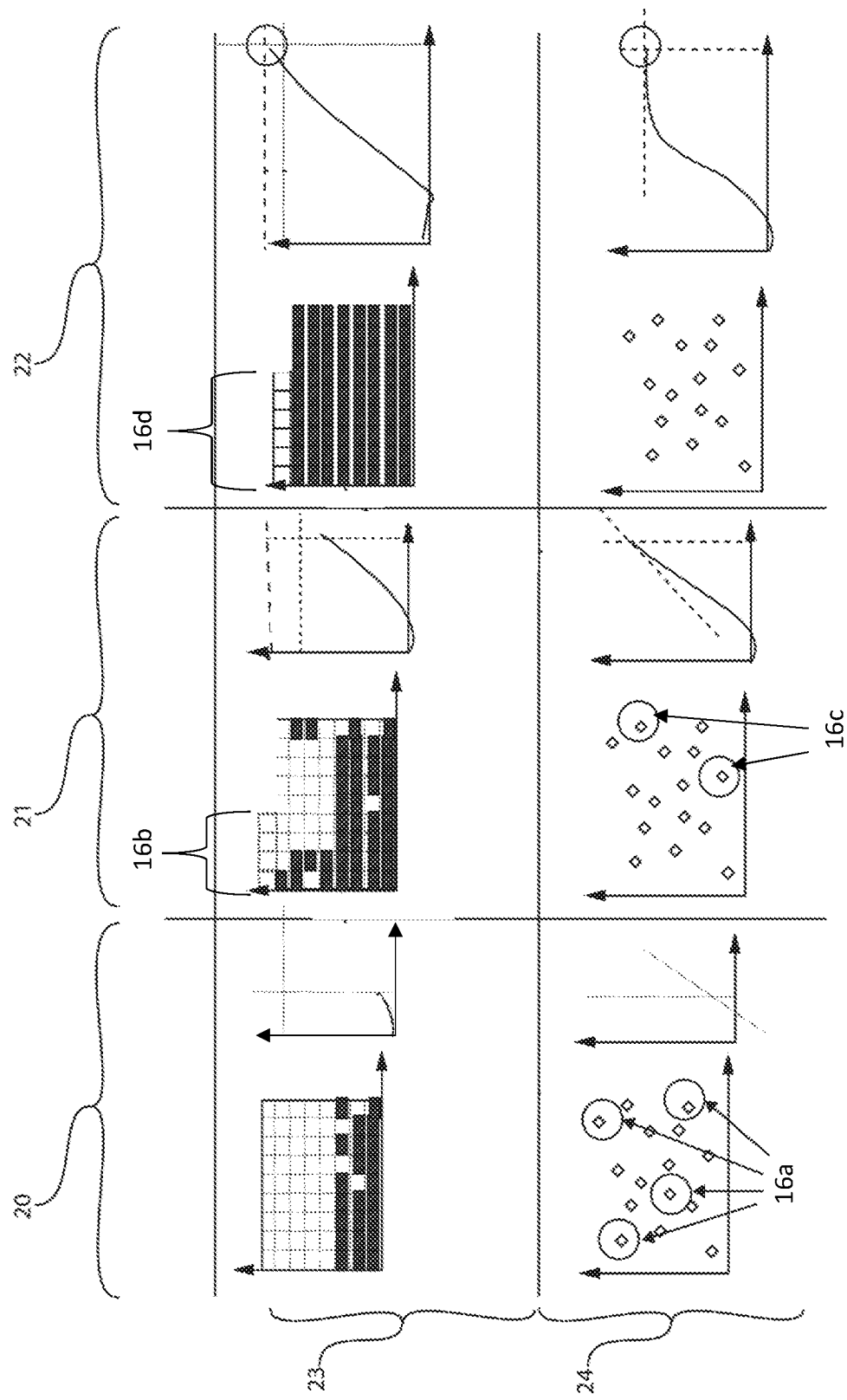
FIG. 7 illustrates one embodiment of feedback from an unintended test-space to an intended test-space, in accordance with one embodiment of the present disclosure.

FIG. 7 illustrates one embodiment of feedback from an unintended test-space 24 to an intended test-space 23. The evaluation includes a state to the initial stage of evaluation 20, a middle stage of evaluation 21, and a final stage of evaluation of determination of completion 22. In some embodiments, the initial stage of evaluation 20 is the stage at which the entire intended test-space is not determined. The initial stage of elevation 20 may include performing feedback from unintended to intended to extend the test space while conducting the intended test according to an estimation at the time of development. The unintended test space 24 of the start to initial stage of evaluation 20 may include detecting "bugs", e.g., programming and/or software bugs, and detecting undesirable behaviors for the test vehicles in the intended test. The undesirable behaviors and bugs of the unintended test space in the initial stage is identified by reference number 16a. The analysis considers the gradient, e.g., increased rate, in the number of feedbacks.

In some embodiments, the middle stage of evaluation 21 is a stage at which the test plan is updated as needed on the premise that the test-space is extended by the feedbacks from the unintended test space to the intended test space. The feedbacks for the undesirable behaviors and bugs from the unintended test space of the initial stage are identified by reference number 16b in the middle stage of the evaluation 21. For example, in the intended test space of the middle evaluation feedbacks are added from the unintended test space 23 during the start to initial stage of evaluation 21. In this instance, the number of test cases to be covered also increases. In the unintended test space 24 of the middle stage evaluation 21, the amount of increase in number of feedbacks from the unintended test to the intended test is checked. The undesirable behaviors and bugs from the unintended test space of the middle stage are identified by reference number 16c. If the evaluation proceeds correctly, the number of feedbacks should converge.

In the final stage of evaluation to time of determination of completion 22, a determination is made as to whether the evaluation is sufficient. The criteria for whether the intended test space 23 is sufficient is whether the rate of coverage is sufficient, e.g., equal to a reference value or higher. For example, if a ratio of completed test cases to all of the test cases reaches no less than a certain value, e.g., normally 100%, it is determined that the intended test is sufficient. The criteria for whether the unintended test is sufficient is whether the rate of feedbacks to the intended test space converges. For the unintended test space 24, if the amount of increase in the number of feedbacks from the unintended test to the intended test converges. The feedbacks for the undesirable behaviors and bugs from the unintended test space of the initial and middle stage are identified by reference number 16d in the final stage of the evaluation 22.

Referring to FIG. 2, feedback from an unintended test-space 24 to an intended test-space 23 at block 7 of the method depicted in FIG. 1 may be provided by the feedback generator 29 of the system 500 for evaluating autonomous driving vehicle safety.

Referring to block 8, the method can further include evaluated intended test space by using traditional test processes/tools. Depending on the evaluation subject, the aforementioned "degree of complexity" and "degree of safety" may be replaced with respective appropriate evaluation functions. In some embodiments, each of which only needs to be capable of unique quantification using a parameter that falls within the evaluation region and can be measured at any timing.

Referring to FIG. 6, for examination of autonomous vehicle simulation, for block 8 of the method depicted in FIG. 1, a peripheral vehicle simulation environment 15 can be employed in which a certain degree of traffic complexity can be maintained (Simulator using active matter). In one embodiment, the periphery vehicle simulator employs three layers of simulated vehicle behavior. The layers may include a section that generates a driving route, a section that generates a specific behavior of a vehicle, and a section that generates a particular behavior comes from driver's personality. Pseudo random values are used to provide any variation in the evaluation and are used to weight the value of each of the layers in the simulation. For example, pseudo random values can be used where each of the vehicles are located, what the initial velocity for the vehicles are, and what kind of route the vehicles should travel on. In some embodiments, these parameters or selections are set "randomly" so that the system can generate various patterns of vehicle's behavior. Pseudo random values are employed, as opposed to pure random values, because the generated behaviors of the methods, systems and computer program products are reproducible. Further details on this step of the present disclosure is provided in U.S. patent application Ser. No. 16/804,737, titled "Automatic Scenario Generator Using a Computer for Autonomous Driving". The entirety of U.S. patent application Ser. No. 16/804,737, titled "Automatic Scenario Generator Using a Computer for Autonomous Driving" is incorporated herein, by reference. Each of the parameters for the degree of traffic complexity is generated pseudorandomly within a designated range. Make a simulation target autonomous vehicle move in a dedicated simulation environment. Perform a simulation in a combined simulation environment (co-simulation) in which interaction between the peripheral vehicles and the autonomous vehicle is enabled. Evaluate the safety of the autonomous vehicle by quantitatively measuring, e.g., an integrated value, a highest value and an average value of the degrees of traffic safety per a certain time. Any kind of (suitable) traditional tool or process to evaluate fed back intended test case at block 8. In some embodiments, this step of the process flow may be provided by the safety evaluator 30 of the system 500 for evaluating autonomous driving vehicle safety, as depicted in FIG. 2.

Block 9 of the method depicted in FIG. 1 may include making a decision to finish the evaluation with both results of the intended/unintended tests. In some embodiments, the intended test case/area must be fulfilled to finish (all test cases must be done and issues found must be corrected). Unintended test case/area cannot be due to unknown limit, but may be saturated by step-by-step feedback (to intended test area). This is illustrated in FIG. 7. In some examples, by defining criteria as saturation-rate (as close as 0% is ideal, but might be decided according to product characteristics, development stage, corporate policy, etc.).

Exemplary applications/uses to which the present invention can be applied include, but are not limited to providing guidance and navigation for autonomous vehicles.

In another aspect, a system 500 for evaluating autonomous vehicle safety is provided, in which the system 500 can include a database of criteria 26 for safety of autonomous vehicles in a test space. The system may also include a test space analyzer 27 for dividing the test space into an intended test space and a un-intended test space. The intended test space includes characterizations for the autonomous vehicle that can be quantified, and the un-intended test space includes characterizations that are not quantifiable. In some embodiments, the system may further include a safety calculator 28 for the intended test space using at least one hardware processor to measure the safety of the autonomous vehicles in the intended test space according the database of criteria for safety. The system for evaluating autonomous vehicle safety may further include a feedback generator 29 for feeding the un-intended test space as feedback into the intended test space, and a safety evaluator 30 for evaluating the intended test space including the feedback from the unintended test space using a combined simulation of peripheral vehicles and autonomous vehicles to provide the evaluation of autonomous vehicle safety.

In some embodiments, the system 500 may employ one or more processors 31, e.g., hardware processor devices, to perform instructions, such as calculations, as described illustrated in FIG. 1. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention. Each of the components for the system 500 for evaluating autonomous vehicle safety that is depicted in FIG. 2 may be interconnected via a system bus 102. In some embodiments, the hardware processor 31 may employ artificial intelligence for data analysis in the evaluation. Artificial intelligence (AI) is the simulation of human intelligence processes by machines, especially computer systems. These processes include learning (the acquisition of information and rules for using the information), reasoning (using rules to reach approximate or definite conclusions) and self-correction. The hardware processor 31 may be incorporated into an artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Any of the systems or machines (e.g., devices) shown in FIG. 2 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIG. 1, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 8:
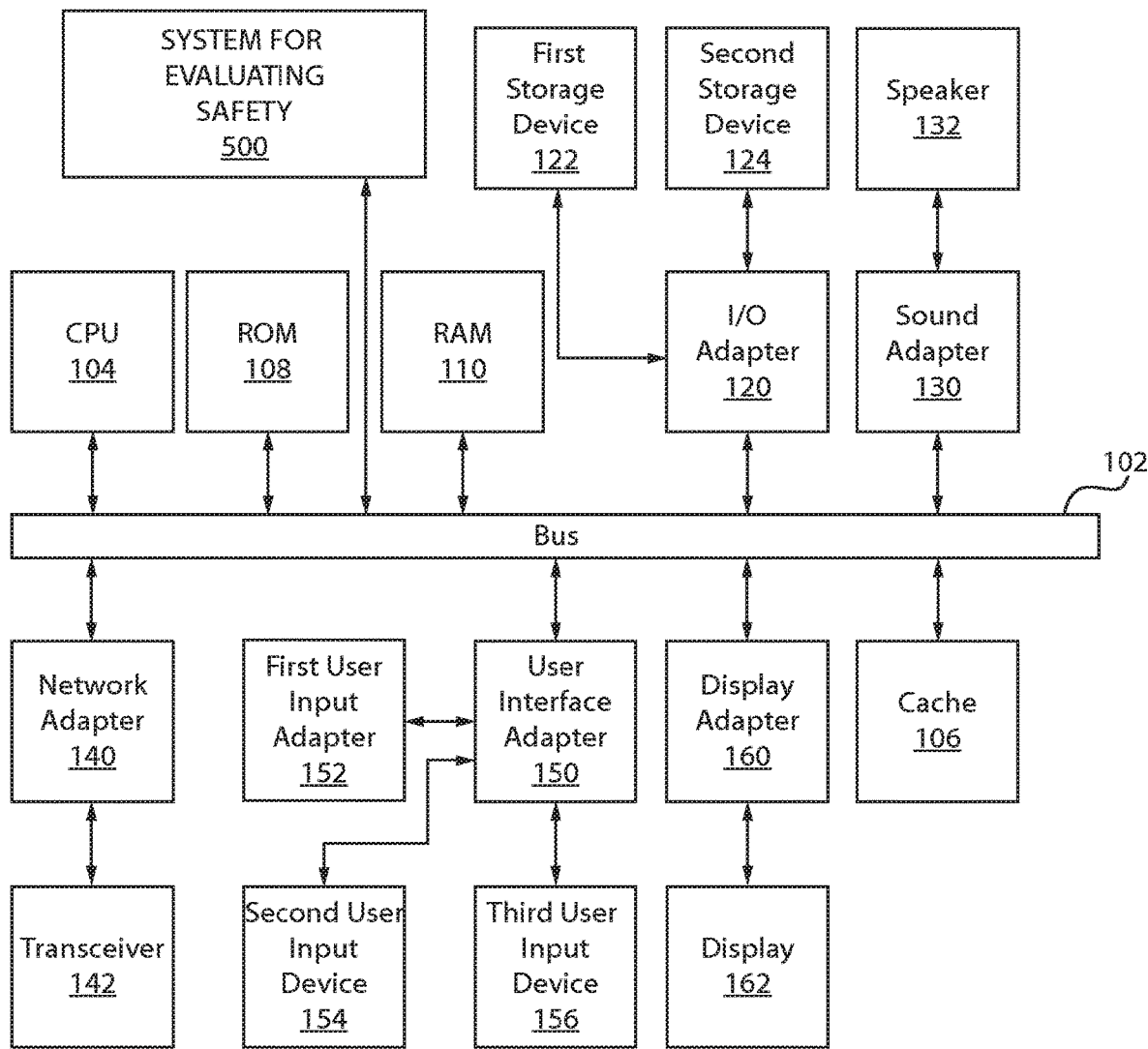
FIG. 8 is a block diagram illustrating a processing system that can incorporate the system for providing a requirement depicted in FIG. 2, in accordance with one embodiment of the present disclosure.

The system 500 for evaluating autonomous vehicle safety may be integrated into the processing system 400 depicted in FIG. 8. The system 500 for evaluating autonomous vehicle safety includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 500 for evaluating autonomous vehicle safety depicted in FIGS. 2 and 8, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the system 500 for evaluating autonomous vehicle safety may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the system 500 for evaluating autonomous vehicle safety are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. For example, the computer program product can provide for evaluating autonomous vehicle safety. The computer program product may include a computer readable storage medium having program instructions embodied therewith, the program instructions executable by a processor. The program instructions can cause the processor to define criteria for safety of autonomous vehicles in a test space. The program instructions can cause the processor to divide the test space into an intended test space and a un-intended test space. The intended test space includes characterizations for the autonomous vehicle that can be quantified, and the un-intended test space includes characterizations that are not quantifiable. The program instructions can cause the processor to measure the safety of the autonomous vehicles in the intended test space. The program instructions can cause the processor to apply the un-intended test space as feedback into the intended test space; and evaluate the intended test space including the feedback from the unintended test space using a combined simulation of peripheral vehicles and autonomous vehicles to provide the evaluation of autonomous vehicle safety.

The computer readable storage medium can be a tangible device that can retain and store instructions for use by an instruction execution device. In some embodiments, the computer readable storage medium may be non-transitory. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
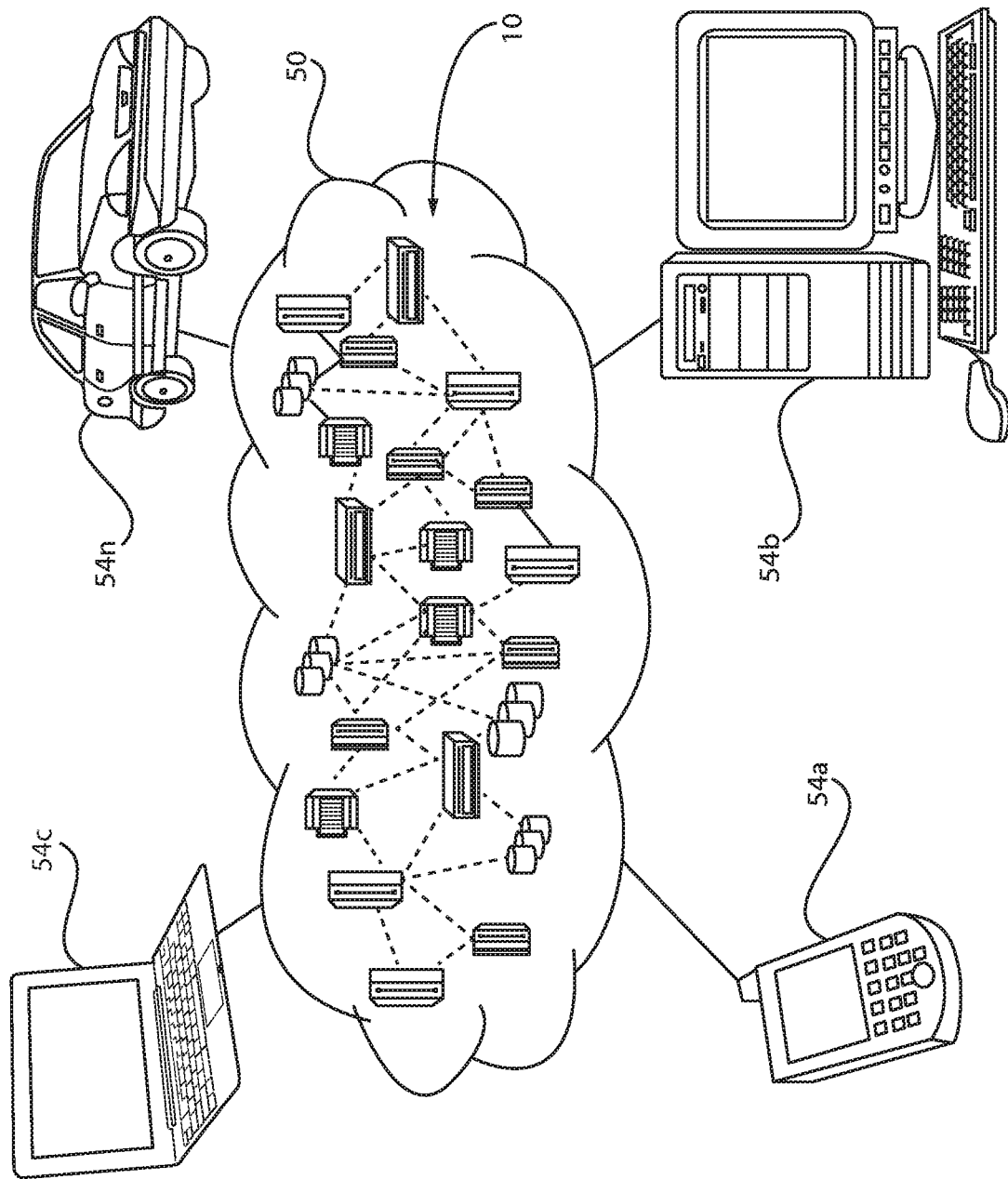
FIG. 9 depicts a cloud computing environment according to an embodiment of the present disclosure.

Referring now to FIG. 9, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 10:
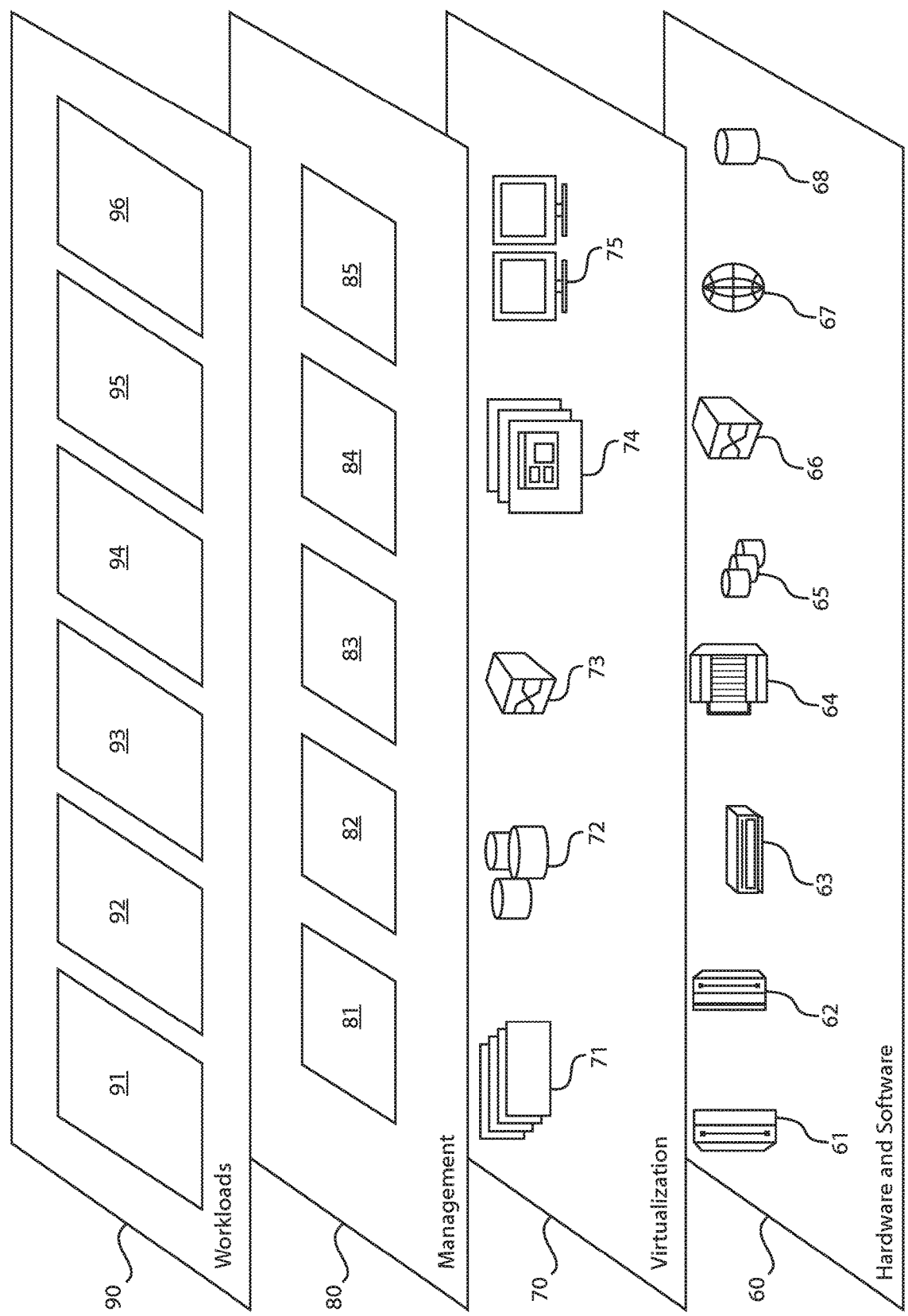
FIG. 10 depicts abstraction model layers according to an embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the system and method for evaluating autonomous vehicle safety 96, which is described with reference to FIGS. 1-9.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for evaluating autonomous vehicle safety (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for evaluating autonomous vehicle safety comprising:
    defining criteria for safety of autonomous vehicles in a test space, wherein criteria for safety includes complexity factor based on a number of lanes for a road on the test space;
    dividing the test space into an intended test space and an unintended test space, wherein the intended test space includes characterizations for the autonomous vehicle that can be quantified for said criteria for safety, and the unintended test space includes characterizations that are not quantifiable for said criteria for safety wherein not quantifiable for said criteria for safety results from unpredictable vehicle behavior resulting from incorrect artificial intelligence that results in performance not consistent with a vehicle's general performance;
    measuring the safety of the autonomous vehicles in the intended test space;
    combining the unintended test space into the intended test space; and
    evaluating the intended test space including the feedback from the unintended test space using a combined simulation of the peripheral vehicles and autonomous vehicles using random criteria for vehicle location, vehicle velocity and vehicle route to provide the evaluation of autonomous vehicle safety.

2. The computer implemented method of claim 1, wherein the criteria for safety of autonomous vehicles includes a measurement of traffic complexity.

3. The computer implemented method of claim 2, wherein measuring the safety of the autonomous vehicles comprises measuring traffic complexity of the peripheral vehicles and the autonomous vehicles on a traffic passageway.

4. The computer implemented method of claim 3, wherein traffic complexity is a measurement comprising a measurement of the number of pathways on a traffic passageway, a number of moving elements on a traffic passageway, a size of the moving elements on the traffic passageway, distances between the moving elements on the traffic passageway, acceleration/deceleration of moving elements on the traffic passageway, a measurement of number of changes between the different pathways on the passageway, and the complexity of the road shape in a unit of time.

5. The computer implemented method of claim 4, wherein the degree of traffic complexity is computed from: $\Sigma_{t \in unitT}$ f lane count(t)+$\Sigma_{t \in unitT}$ f vehicle count(t)+$\Sigma_{t \in unitT}$ vehicle sizes(t)+$\Sigma_{t \in unitT}$ vehicle speed differential(t)+$\Sigma_{t \in unitT}$ distance between vehicles(t)+$\Sigma_{t \in unitT}$ acceleration/deceleration (t)+$\Sigma_{t \in unitT}$ lane change count(t)+$\Sigma_{t \in unitT}$ topology(t), wherein t is a function of time.

6. The computer implemented method of claim 1, wherein the criteria for safety of autonomous vehicles includes a measurement of traffic safety.

7. The computer implemented method of claim 6, wherein measuring the safety of the autonomous vehicles comprises measuring traffic safety of the peripheral vehicles and the autonomous vehicles on a traffic passageway.

8. The computer implemented method of claim 7, wherein traffic safety is a measurement comprising at least one of a number of collisions of said autonomous vehicle, number of approaches by the autonomous vehicle to dangerous zones, number of changes in the complexity of traffic and combinations thereof.

9. The computer implemented method of claim 8, wherein traffic safely is a measurement of degree of traffic safety computed from:

$$\text{Degree of traffic safety}(T\text{-safety}) = \Sigma_{t \in unitT} f \text{ collisions}(t) + \Sigma_{t \in unitT} f \text{ approaches to dangerous zones}(t) + \Sigma_{t \in unitT} f \text{ traffic complexity degree change}(t)$$

wherein t is time.

10. The computer implemented method of claim 1, wherein the unintended data space includes software bugs, vehicle performance by artificial intelligence that is outside practical vehicle performance, and when a number of approaching vehicles approaches an autonomous vehicle over a calculatable threshold.

11. A system for evaluating autonomous vehicle safety comprising:
   a database of criteria for safety of autonomous vehicles in a test space, wherein criteria for safety includes complexity factor based on a number of lanes for a road on the test space;
   a test space analyzer for dividing the test space into an intended test space and a un-intended test space, wherein the intended test space includes characterizations for the autonomous vehicle that can be quantified for said criteria for safety, and the unintended test space includes characterizations that are not quantifiable for said criteria for safety, wherein not quantifiable for said criteria for safety results from unpredictable vehicle behavior resulting from incorrect artificial intelligence that results in performance not consistent with a vehicle's general performance;
   a safety calculator for the intended test space using at least one hardware processor to measure the safety of the autonomous vehicles in the intended test space according the database of criteria for safety;
   a feedback generator for combining the unintended test space into the intended test space; and
   a safety evaluator for evaluating the intended test space including the feedback from the unintended test space using a combined simulation of the peripheral vehicles and autonomous vehicles using random criteria for vehicle location, vehicle velocity and vehicle route to provide the evaluation of autonomous vehicle safety.

12. The system of claim 11, wherein the criteria for safety of autonomous vehicles includes at least one of a traffic criteria for traffic complexity and a safety criteria for traffic safety.

13. The system method of claim 12, wherein the safety calculator measures the safety of the autonomous vehicles by measuring at least one of the traffic complexity of the peripheral vehicles and the autonomous vehicles on the traffic passageway and the traffic safety of the peripheral vehicles and the autonomous vehicles on the traffic passageway.

14. The system of claim 13, wherein traffic complexity is a measurement comprising a measurement of the number of pathways on a traffic passageway, a number of moving elements on a traffic passageway, a size of the moving elements on the traffic passageway, distances between the moving elements on the traffic passageway, acceleration/deceleration of moving elements on the traffic passageway, a measurement of number of changes between the different pathways on the passageway, and the complexity of the road shape in a unit of time.

15. The system of claim 13, wherein the safety calculator measures the safety of the autonomous vehicles by measuring traffic safety of the peripheral vehicles and the autonomous vehicles on a traffic passageway.

16. The system of claim 12, wherein traffic safety is a measurement comprising at least one of a number of collisions of said autonomous vehicle, number of approaches by the autonomous vehicle to dangerous zones, number of changes in the complexity of traffic and combinations thereof.

17. The system of claim 12, wherein the unintended data space includes software bugs, vehicle performance by artificial intelligence that is outside practical vehicle performance, and when a number of approaching vehicles approaches an autonomous vehicle over a calculatable threshold.

18. A computer program product for evaluating autonomous vehicle safety, the computer program product comprising a computer readable storage medium having program instructions embodied therewith, the program instructions executable by a processor to cause the processor to:
   define criteria, using the processor, for safety of autonomous vehicles in a test space, wherein criteria for safety includes complexity factor based on a number of lanes for a road on the test space;
   divide, using the processor, the test space into an intended test space and an unintended test space, wherein the intended test space includes characterizations for the autonomous vehicle that can be quantified for said criteria for safety, and the unintended test space includes characterizations that are not quantifiable for said criteria for safety, wherein not quantifiable for said criteria for safety results from unpredictable vehicle behavior resulting from incorrect artificial intelligence that results in performance not consistent with a vehicle's general performance;
   measure, using the processor, the safety of the autonomous vehicles in the intended test space;
   apply, using the processor, the unintended test space as feedback into the intended test space; and
   evaluate, using the processor, the intended test space including the feedback from the unintended test space using a combined simulation of the peripheral vehicles and autonomous vehicles using random criteria for vehicle location, vehicle velocity and vehicle route to provide the evaluation of autonomous vehicle safety.

19. The computer program product of claim 18, wherein said measure using the processor of the safety of the autonomous vehicles comprises a measurement of at least one of traffic complexity of the peripheral vehicles and the autonomous vehicles on the traffic passageway, and traffic safety of the peripheral vehicles and the autonomous vehicles on the traffic passageway.

* * * * *